Patented Apr. 9, 1946

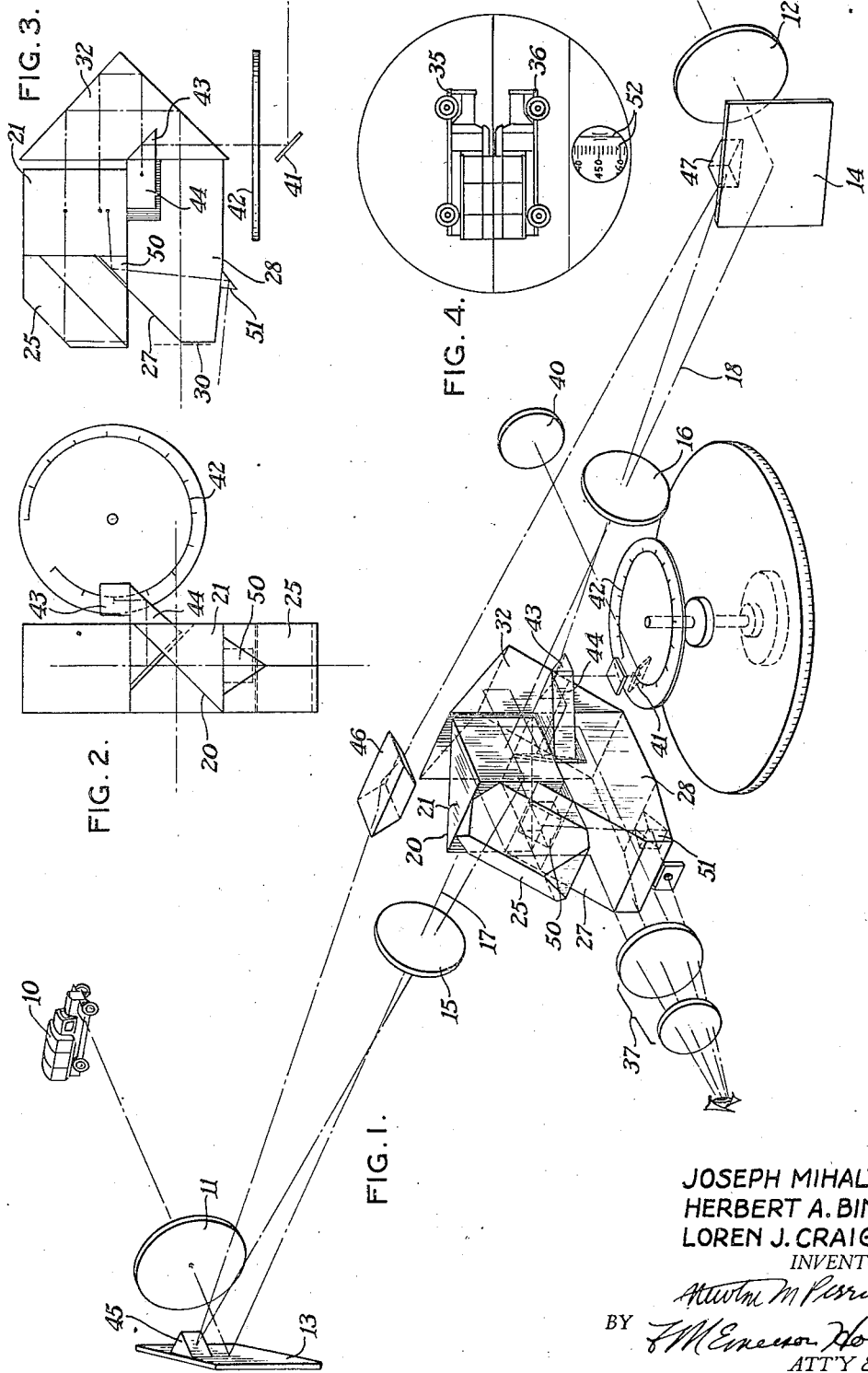

2,398,027

UNITED STATES PATENT OFFICE 2,398,027

INVERT FIELD RANGE FINDER

Joseph Mihalyi, Herbert A. Bing, and Loren J. Craig, Rochester, N. Y., assignors to Eastman Kodak Company, Rochester, N. Y., a corporation of New Jersey Application September 12, 1944, Serial No. 553,718

5 Claims. (Cl. 88—2.7)

This invention relates to range finders particularly to those of the invert split field type.

The invention has primarily to do with the central prism assembly and one advantage of the present invention is that the assembly is interchangeable with one for providing superimposed images as described in our copending application Serial No. 553,717 filed concurrently herewith. It is the primary object of the invention to provide a central prism assembly for giving an invert coincidence split field in a range finder in which the object beams from the viewing points are directed symmetrically and directly toward each other.

It is an object of one particular form of the present invention to provide convenient and suitable means for introducing adjacent to the object beams, a collimation control beam such as described in Mihalyi's copending applications the first of which Serial No. 472,831, filed January 19, 1943, contains a list of the other similar cases. The invention also provides means for directing this collimation control beam into focus at one edge of the image plane or comparison field of the range finder.

It is the object of a preferred embodiment of the invention to provide a central prism assembly in which one image is inverted relative to the other, but in which both object beams suffer exactly the same number of front surface mirror reflections and differ by only one in the number of internal reflections. The most preferred embodiment of the invention has a central prism assembly which appears quite complex but which nevertheless can be assembled directly and when assembled is quite rigid and permanent.

According to the present invention a central prism assembly for range finders is arranged to receive the object beams heading horizontally toward each other and to bring them into juxtaposition in the vertical image plane. It consists of a totally reflecting surface which will reflect from both sides, such as a hypotenuse surface of a prism, positioned at an angle (preferably but not necessarily 45°) to both beams to reflect them away from each other. One of the beams is reflected horizontally and then vertically downward or upward by a roof prism whence the beam strikes another reflecting surface (hereinafter called the second reflecting surface) which in turn reflects it horizontally to the image plane. The other beam is reflected vertically and then horizontally back by a Porro prism. Both beams thus arrive at the image plane which is preferably right at the edge of the "second reflecting surface."

Preferably the reflecting surfaces are so arranged that each beam receives one front surface reflection. For example the first discussed beam may be reflected internally to the roof prism whereat it is twice reflected internally down to "the second reflecting surface" which is a front surface mirror and the second beam in this case receives its first reflection at a front surface mirror whereat it is directed to the Porro prism.

With such an arrangement the center of the prism assembly is substantially unused since the light traveling through the Porro prism goes only to the lower half of the image field. In a preferred embodiment of the invention this space is utilized for the introduction of a collimation control beam. A suitable reflector is located behind the "second reflecting surface" to direct the collimation control beam into the Porro prism whence it travels at a slight angle to the range finder object beam out to one viewing point, from this viewing point past the central prism assembly to the other viewing point and back along with the other object beam into the central prism assembly. Preferably the arrangement is such that this returning beam is reflected slightly below the object beam so that instead of entering the roof prism it strikes an auxiliary reflector which deflects it to one side, eventually through suitable additional spot reflectors to arrive at the image plane adjacent to one of the images. It will readily be seen that this arrangement results in a compact rigid structure, especially when the "second reflecting surface" is one surface of a large supporting prism to which the Porro prism and the prism supporting the first reflecting surface are cemented.

The details of this structure will be fully understood from the following description when read in connection with the accompanying drawing in which:

Fig. 1 is a perspective view of the optical system of a preferred embodiment of the invention.

Figs. 2 and 3 are respectively a top view and a side elevation of the central prism assembly shown in Fig. 1.

Fig. 4 shows the view through the eyepiece of the system.

In Fig. 1 light from an object represented by truck 10 is received through end windows 11 and 12 of a range finder which constitute the right and left viewing points. The beams are then respectively reflected by end reflectors 13 and 14 directly toward each other through objectives 15 and 16. These beams 17 and 18 strike opposite sides of a total reflecting surface 20 which is coated on a prism 21. The beam 18 is totally internally reflected to a roof prism 25 whereat it is inverted by one horizontal reflection and reflected downward to a so-called second reflecting surface 27 in the form of a metallized surface on a large supporting or base prism 28. This beam 18 is then reflected horizontally to the comparison plane 30 of the range finder which is located at the edge of the second reflecting surface 27.

The left viewing point beam 17 on the other hand receives a front surface reflection at the surface 20 and is directed to a Porro prism 32 which reflects the beam vertically downward and then horizontally back through the prism 28 to the image plane 30 which is adjacent to an exit surface of the prism 28. It will be noted that both beams receive only one front surface reflection, the beam 18 receives three internal reflections and the beam 17 receives two internal reflections before arriving at the comparison plane. The juxtaposed images 35 and 36 are viewed through an eyepiece 37.

It will be noted particularly from Fig. 3 that the central portion of this whole prism assembly namely that which is behind the reflecting surface 27 is unused as far as forming the comparison images is concerned. This region is utilized for the introduction of a collimation control beam in the following manner. Daylight is admitted by a window 40 and mirror 41 on a spiral scale 42 which constitutes a collimation control element as described in the Mihalyi copending applications referred to above. The important point as far as the present invention is concerned is the manner in which this collimation control beam is introduced into the optical system of the range finder and eventually is focused in the comparison plane thereof. Light from the element 42 is reflected by suitable prisms 43 and 44 into the Porro prism 32 as best shown in Fig. 3. This light then strikes the outside of the surface 20 and is reflected through the objective 15 whereat it is collimated since the element 42 is optically at the same distance from the objective 15 as is the image plane of the range finder. The collimated control beam is reflected by reflector 45, dove prism 46 and reflector 47 back into alignment with the right hand object beam but at a slight angle thereto so that it passes through the objective 16. This beam strikes the inside of the first reflector 20 and is reflected forward but not to the roof prism 25. Instead, the beam strikes a small additional prism 50 which directs it substantially vertically downward through the support prism 28 to strike another small spot prism 51 which in turn reflects it into focus in the image plane adjacent to the comparison images to form the image 52 of the element 42. Throughout this specification and claims the terms horizontal and vertical are used purely relative to one another since obviously the instrument as a whole may be oriented in any direction in absolute space.

We wish to point out that our invention is not limited to this specific structure but is of the scope of the appended claims.

We claim:

1. A central prism assembly for an invert coincidence split field range finder adapted to receive independent beams heading horizontally directly toward each other and to bring them into juxtaposition at a vertical image plane comprising a totally reflecting surface positioned at an angle to, and in the path of, both beams to reflect them away from each other, a roof prism positioned to receive one of the beams and to reflect it vertically and a second reflecting surface positioned to receive said one beam and reflect it horizontally to the image plane and a Porro prism positioned to receive the other beam and reflect it also horizontally to the image plane past the edge of said second reflecting surface.

2. A prism assembly according to claim 1 in which the first mentioned totally reflecting surface is a metallized hypotenuse surface of a right angle prism positioned to internally reflect the one beam to the roof prism and to externally reflect the other beam to the Porro prism.

3. A prism assembly according to claim 1 in which the first mentioned totally reflecting surface is a metallized hypotenuse surface of a right angle prism positioned to internally reflect the one beam to the roof prism and to externally reflect the other beam to the Porro prism and in which the second reflecting surface is a metallized external surface of a supporting prism member rigidly attached to the right angle, the roof and the Porro prisms and having an exit face parallel to the image plane and adjacent to the second reflecting surface.

4. A prism assembly according to claim 1 including behind the second reflecting surface, reflector means for introducing a collimation control beam into the Porro prism.

5. A prism assembly according to claim 1 in which the second reflecting surface effectively extends under the roof of the roof prism to receive a marginal portion of the light reflected with said one of the beams and to reflect it to one side of the juxtaposed beams and in which a third reflecting surface is included to receive said marginal portion and to reflect it to the image plane.

JOSEPH MIHALYI.
HERBERT A. BING.
LOREN J. CRAIG.